Patented Apr. 8, 1930

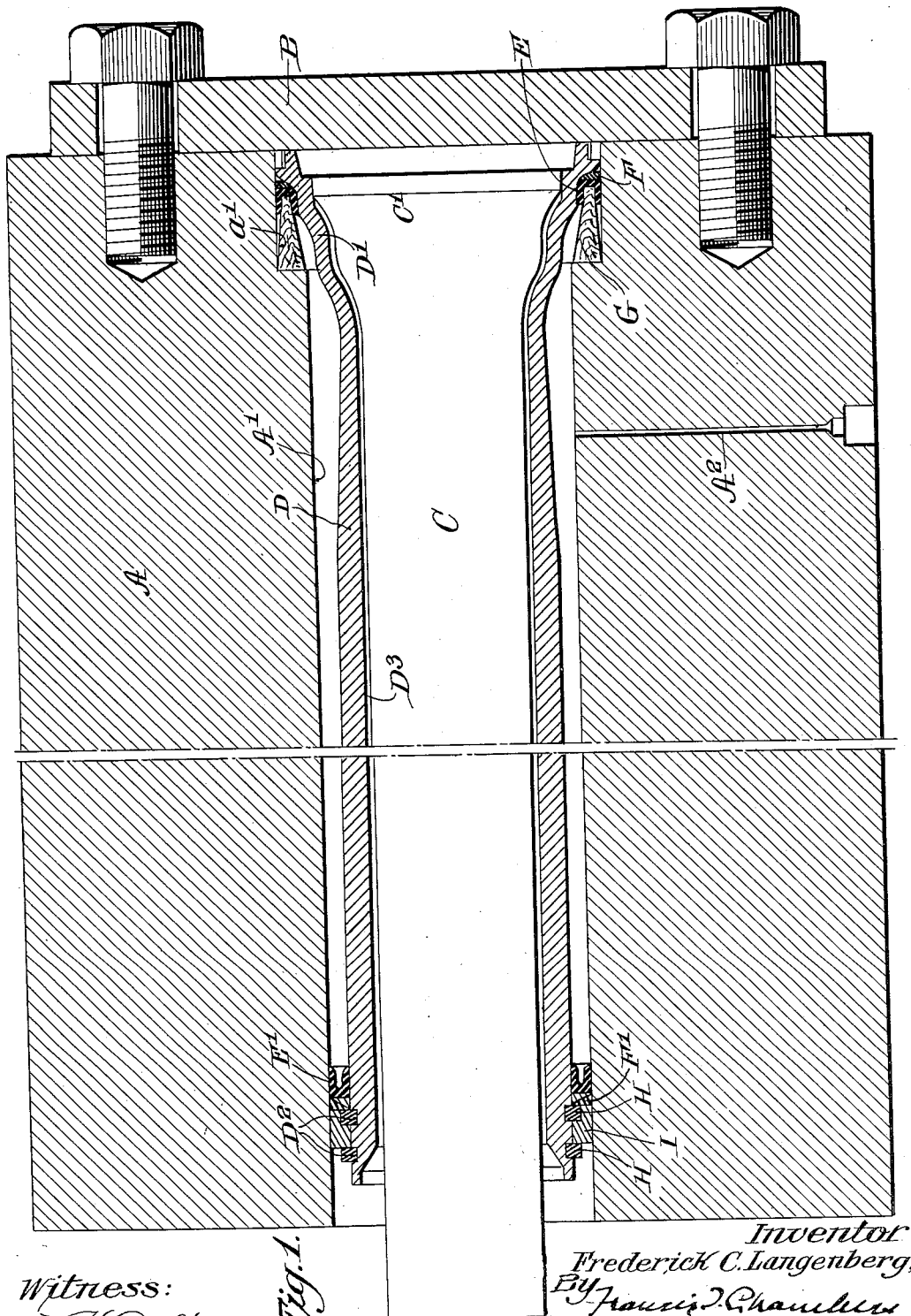

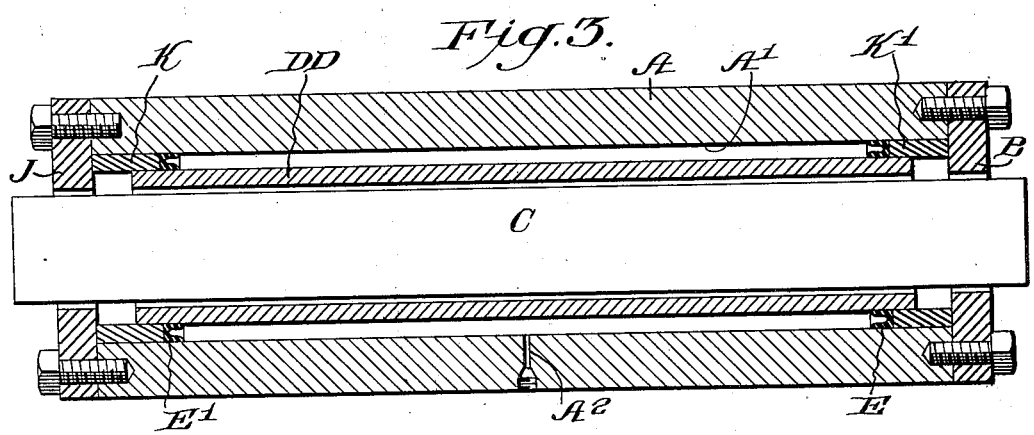
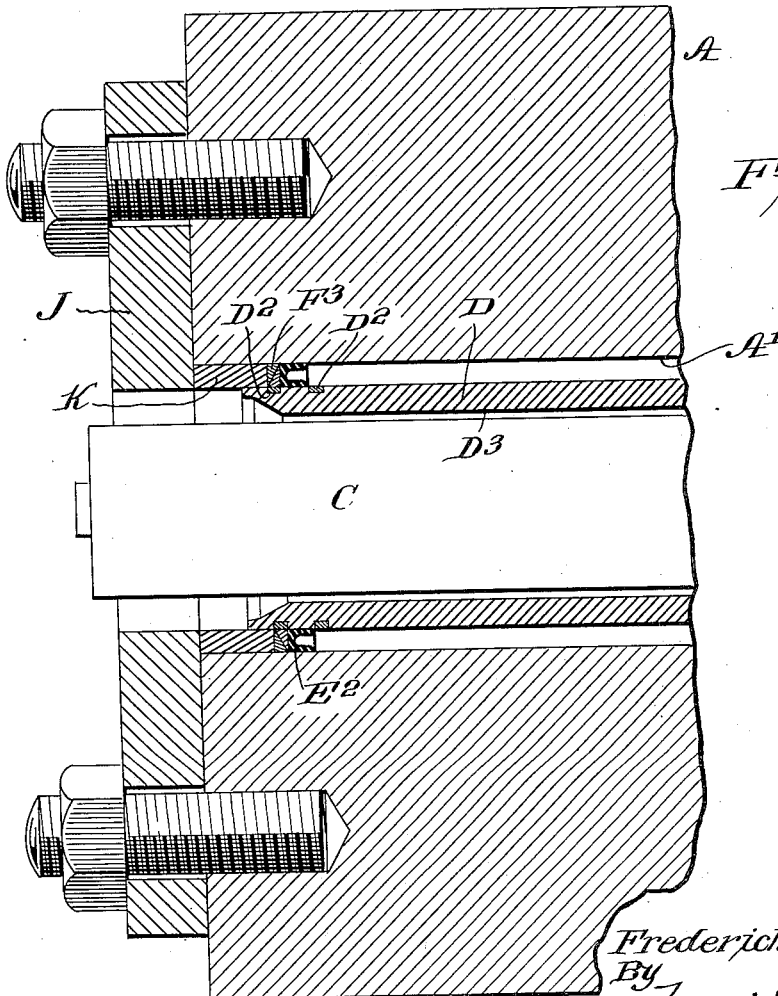

1,753,747

UNITED STATES PATENT OFFICE

FREDERICK C. LANGENBERG, OF NEW YORK, N. Y., ASSIGNOR TO UNITED STATES CAST IRON PIPE & FOUNDRY COMPANY, OF BURLINGTON, NEW JERSEY, A CORPORATION OF NEW JERSEY

MANUFACTURE AND REPAIR OF CENTRIFUGAL MOLDS

Application filed December 29, 1928. Serial No. 329,189.

My invention relates to the manufacture of steel molds such as are used in the centrifugal casting of cast iron pipes and the object of my invention is to provide an improved method for the manufacture of such molds whereby a mold of improved wearing qualities can be produced and, more especially, to provide a method for the reclamation of used molds which have become roughened at their interior surface, whereby such used molds can be cheaply remanufactured into new molds. My invention, broadly speaking, consists in a method by which metal bodies, particularly forgeable steel bodies of a generally cylindrical form, are subjected to external fluid pressure sufficient in amount to effect a radial contraction of the body accompanied by a simultaneous longitudinal elongation. This forming process is in itself new and useful but I have also found that as a result of its use the crystals or other convenient elements of the metal body are so changed in form as to impart highly desirable qualities to the treated body. This broad invention forms the subject matter of my co-pending application, filed December 29, 1928, Serial No. 329,208, and my present invention is specifically for the method of manufacturing centrifugal steel molds by the application of the process above indicated to a blank having roughly the general conformation of the mold to be produced and, more especially, the manufacture of new molds from used molds by the application of this process, as a result of which I have found that a centrifugal mold of great durability is produced and that used molds which have heretofore had only a scrap steel value can be easily and cheaply converted into new molds of exceptionally good quality.

By preference, the steel blank from which the mold is to be made is contracted upon a mandrel, the diameter of which is somewhat less than the inner diameter of the mold to be manufactured and the contracted and expanded blank after treatment is poured out and smooth finished.

Where my process is applied to a used mold having a roughened interior surface this roughened surface may be cut away either before or after treatment. By preference I first contract and elongate the used mold to a diameter determined by that of the mandrel which will allow for the cutting away of sufficient metal to remove the inner layer to a sufficient depth to insure the removal of sufficient metal to insure that the roughened and cracked inner layer of the used mold shall be completely removed and I then bore out the compacted and elongated blank to the required inner diameter of the mold and smooth finish its inner surface.

While the elongation of the blank under treatment will occur by the mere act of subjecting the exterior of the blank to sufficient pressure to radially contract it, I have sometimes found it advisable to provide means whereby the fluid under pressure will be made to exert not only a contracting but a direct longitudinal pull upon the blank, thereby facilitating the elongation.

I have found it advisable to subject the blank, after the contracting and elongating treatment, to a heat treatment of from 200° C. to 400° C., the result of which treatment is, I have found, to increase the hardness and wearing quality of the centrifugal mold.

It is necessary that the wall thickness of the blank treated by my process for the manufacture of a centrifugal steel mold should be sufficient to resist the tendency of the pressure applied to the exterior of the blank to crumple the blank rather than to radially contract it. This wall thickness will differ with tubes of different diameter and, as an example, I will say that in the treatment of a blank of eight inches internal diameter, I have found that the wall thickness should not be less than a quarter of an inch.

The apparatus which I use for the application of my improved process of manufacturing centrifugal molds is, I believe, new with me and is described and claimed in my co-pending application to which reference is made above.

For a further understanding of my invention, reference is made to the drawings in which the nature of my improvements will be best understood when described in connection therewith and in which drawings Figure 1 represents an apparatus devised for the practical application of my improved process showing in connection with the said apparatus a used mold located therein to serve as a blank for the manufacture of a new mold by the application of my process.

Figure 2 represents a modification of the apparatus shown at the left hand end of Figure 1, and Figure 3 illustrates a further modification of the apparatus whereby longitudinal expansion of the blank under treatment is permitted in both directions.

A indicates a container of great strength embodying an inner chamber indicated at $A^1$ and a port or conduit passage $A^2$ by means of which fluid under pressure can be introduced into the central chamber. As shown in Figure 1, the central chamber of the container is handled as indicated at $a^1$ to adapt the apparatus for the treatment of molds intended for the manufacture of bell ended pipes by the centrifugal process. B indicates an end plate at the right hand end of the container. C is a mandrel located in the container and, as shown, having an enlarged end $C^1$, the outer end of which, as shown in Figure 1, abuts against the inside of the bell end of the mold. D is the blank to be treated, in this case illustrated as a used mold having a bell end $D^1$ and having at its spigot end circumferential grooves $D^2, D^2$, such as are provided for packing rings where the mold is used in a water jacket. $D^3$ indicates the inner surface of the used mold, some portions of which have become cracked and roughened by use so as to make the mold no longer available for the centrifugal casting of pipes. E is a packing ring fitted between the bell end of the mold blank and the surface of the enlarged chamber $a^1$. F is a ring fitting against the outer flange of the bell end of the mold and serving as a support for the packing ring, G indicating a wood spreader, the end of which enters the U shaped section of the packing ring, as shown. $E^1$ indicates a packing ring similar to the packing ring E. H, H, are rings located in and projecting from the grooves $D^2, D^2$. I is an annular block resting against the outer ring H and extending over the outside of the inner ring H and $F^1$ is a ring which directly supports the packing ring and contacts with the inner ring H and with the blank I, as shown.

The parts being assembled as shown in Figure 1, fluid under great pressure is admitted through the port $A^2$, as a result of which the used mold D, which is the blank to be treated in the illustrated construction, is radially compacted upon the mandrel C and simultaneously longitudinally elongated, this elongation being aided by the pressure of the fluid upon the packing ring $E^1$, which, being firmly attached to the spigot end of the blank as described, serves as a piston directly attached to the end of the blank and subject to the pressure of the fluid in the container. Care must be taken where this construction is used that the area of the piston made up of the packing ring and its supports should not be too great for while a certain amount of direct elongating pressure is desirable, it will be quite possible to provide for too much and to tear the blank in two.

In the modification illustrated in Figure 2, an end plate J is provided at the spigot end of the apparatus which, through a support or follower indicated at K, supports a ring $F^3$ which in turn supports the packing ring $E^2$. In this modified construction the packing ring $E^2$ exerts no longitudinal pull upon the blank, the elongation of which will take place naturally from the contraction of the blank by the pressure applied to its exterior.

In Figure 3 the blank indicated at DD is shown as of cylindrical form and the packing rings E and $E^1$ on each end of the machine are supported on supports or followers K, $K^1$, which in turn support two packing rings as in Figure 2. By this construction it will be obvious that the blank not being radially compacted on the mandrel will be free to extend longitudinally in both directions.

Having now described my invention, what I claim as new and desire to secure by Letters Patent, is:

1. The method of manufacturing a steel mold of improved wearing qualities for the centrifugal casting of tubular bodies which consists in radially contracting and longitudinally elongating a steel tube by fluid pressure applied to the exterior of the tube and smooth finishing the interior of the contracted tube to the form of the exterior of the casting to be formed therein.

2. The method of claim 1, in which the contracted tube is subjected to heat treatment to improve the structure of the metal.

3. The method of claim 1 in which the steel tube is given the general form of the mold to be made therefrom by bringing it in contact with a mandrel having the conformation of the inner surface of the mold to be formed at the end of the contracting process.

4. The method of manufacturing new centrifugal molds from steel molds which have become roughened by use which consists in radially contracting and longitudinally lengthening said used molds by subjecting them to externally applied fluid pressure, cutting away the roughened interior surface of the used molds at some stage of the treatment prior to the finishing of the molds and smooth finishing the interior of the contracted molds.

5. The method of claim 4, in which the roughened interiors of the used molds are cut away after the contraction of the used molds.

6. The method of claim 4, in which the contracted molds are subjected to heat treatment after their contraction.

7. The method of claim 4, in which the used molds are brought to the general conformation of the molds to be produced therefrom by bringing them in contact with the mandrel at the end of the contracting process.

8. The method of manufacturing new steel molds for the centrifugal casting of pipes from molds which have become roughened by use which consists in forging the used molds to a reduced diameter upon a mandrel, removing their roughened surfaces at some stage of the treatment and imparting to the inner surfaces of the new molds the smooth finished form of the pipes to be cast therein.

FREDERICK C. LANGENBERG.